United States Patent

Saffari et al.

[11] Patent Number: 5,365,062
[45] Date of Patent: Nov. 15, 1994

[54] PHOTOELECTRIC SENSOR ASSEMBLY WITH TRANSPARENT HOUSING AN INTEGRALLY MOLDED LENS

[75] Inventors: Akbar Saffari, Milwaukee; Francis W. Camps, West Allis; Jerry A. Medema, Watertown; Charles J. Turner, Milwaukee; Jeffrey J. Wolf, Brown Deer, all of Wis.

[73] Assignee: Eaton Corporation, Cleveland, Ohio

[21] Appl. No.: 212,410

[22] Filed: Mar. 14, 1994

Related U.S. Application Data

[63] Continuation of Ser. No. 956,189, Oct. 5, 1992, abandoned.

[51] Int. Cl.$^5$ ............................................. H01J 5/02
[52] U.S. Cl. ................................. 250/239; 250/216
[58] Field of Search ............... 250/216, 238, 239, 221, 250/222.1

[56] References Cited

U.S. PATENT DOCUMENTS

| | | | |
|---|---|---|---|
| 2,491,192 | 12/1949 | Martin et al. | 250/239 |
| 3,247,349 | 4/1966 | Duncan | 200/153 |
| 4,207,464 | 6/1980 | Fukuyama et al. | 250/239 |
| 4,217,492 | 8/1980 | Fayfield | 250/239 |
| 4,354,106 | 10/1982 | Walter | 250/239 |
| 4,553,033 | 11/1985 | Hubble, III et al. | 250/353 |
| 4,876,446 | 10/1989 | Kambe et al. | 250/221 |
| 5,013,911 | 5/1991 | Koshida et al. | 250/239 |
| 5,124,549 | 6/1992 | Michaels et al. | 250/239 |
| 5,130,556 | 7/1992 | Duncan et al. | 250/239 |
| 5,204,538 | 4/1993 | Genovese | 250/571 |
| 5,256,873 | 10/1993 | Turner et al. | 250/239 |

Primary Examiner—David C. Nelms
Attorney, Agent, or Firm—Larry G. Vande Zande

[57] ABSTRACT

A low cost assembly comprising only three major components: a circuit board assembly, a molded plastic housing and a molded plastic cover. The plastic parts are transparent polycarbonate (natural "Lexan") wherein the housing has an integrally molded optical quality lens. Mounting features are integrally molded on the housing and cover. The circuit board assembly uses a common board, trace pattern and terminals and can be either a source or detector by appropriate selection of electronic components mounted to the board. A plurality of rounded bosses on the housing and larger round recesses in edges of the circuit board provide a light interference fit between housing and board to firmly hold the board in place and provide correct orientation of the board relative to the housing. The board may be readily removed and replaced for field repair of the sensor.

9 Claims, 4 Drawing Sheets

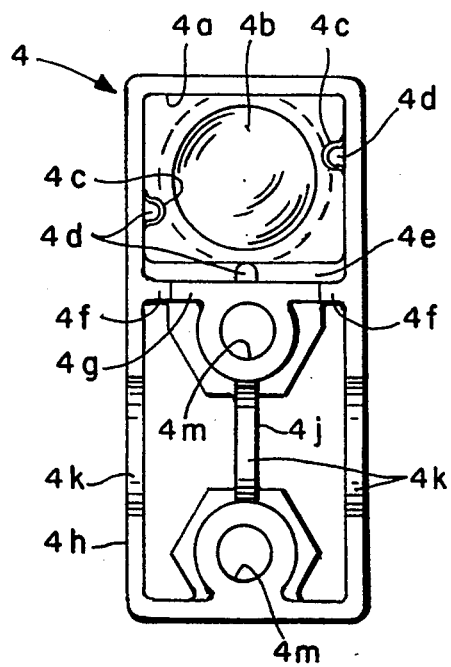
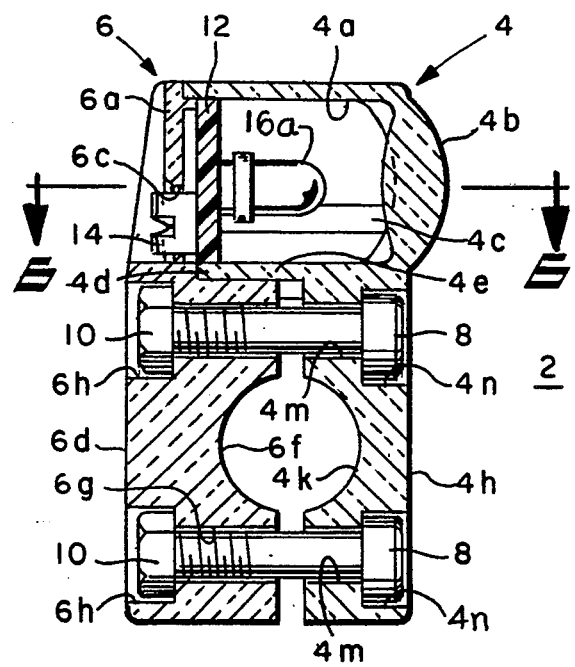
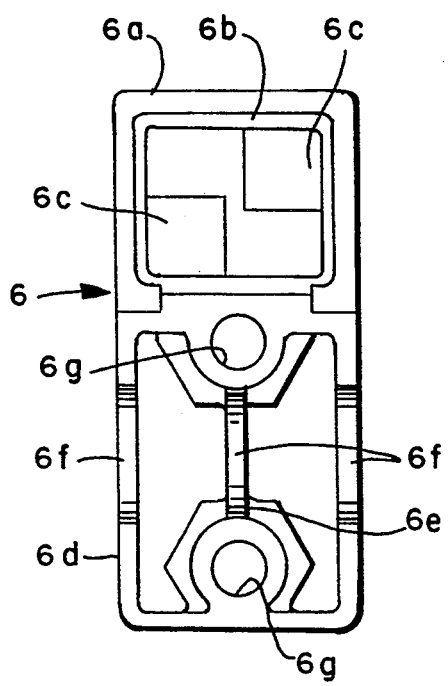
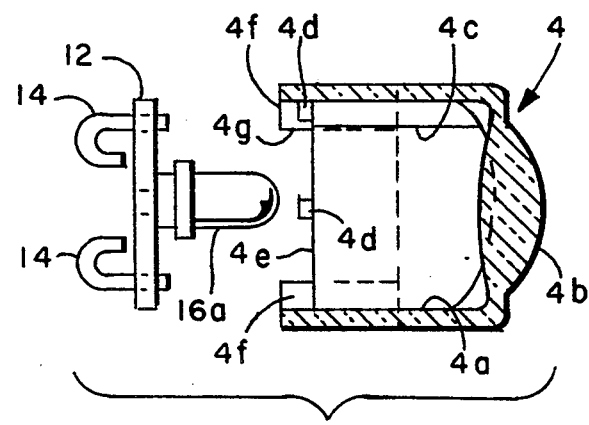

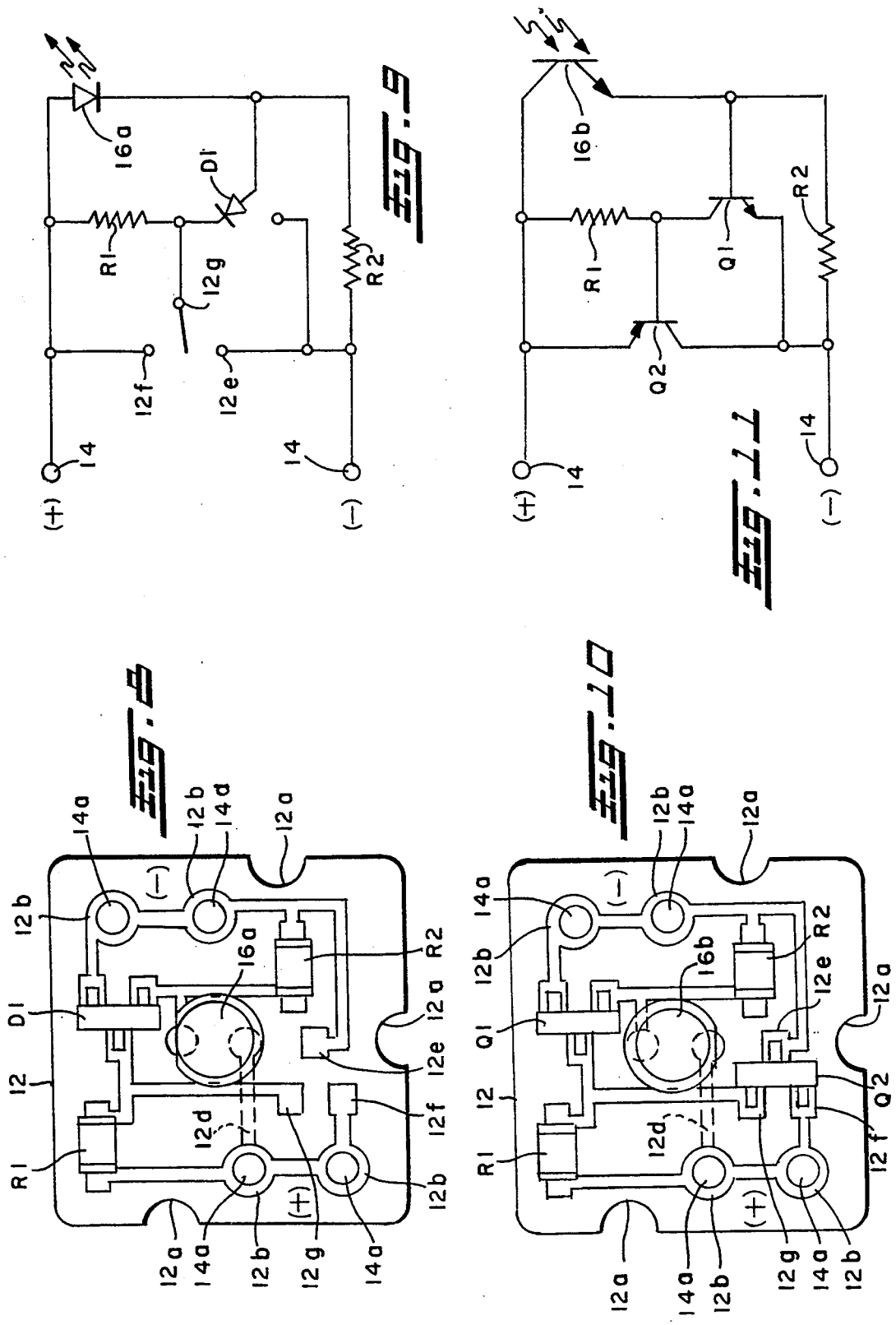

PHOTOELECTRIC SENSOR ASSEMBLY WITH TRANSPARENT HOUSING AN INTEGRALLY MOLDED LENS

This application is a continuation of Ser. No. 956,189 filed Oct. 5, 1992, now abandoned.

BACKGROUND OF THE INVENTION

This invention relates to photoelectric sensors and in particular to through beam photoelectric sensors. More particularly, the invention relates to a low cost photoelectric sensor assembly for a through beam photoelectric sensor which may readily be repaired in the field.

The use of sensors to monitor the presence or absence of an object, its position, or some other condition of the object in manufacturing and handling apparatus is steadily increasing, due largely to the availability of computers, microcomputers and the like which can quickly respond to the sensed conditions and make appropriate changes in the process. A piece of manufacturing or material handling apparatus may contain numerous sensors. Photoelectric sensing is a popular form of sensing for many applications. However, the cost of photoelectric sensors is a deterrent to using this form of sensor in the growing quantities conceivable for such manufacturing and material handling apparatus. Moreover, since most sensing applications are in manufacturing production lines, and since it is undesirable to shut down such production lines for repair of any element thereof, repair of most photoelectric sensors presently available comprises replacement of the sensor on the site.

SUMMARY OF THE INVENTION

This invention provides a photoelectric sensor assembly which is particularly low cost and of modular construction to permit field replaceability of the electronics of the device without need to replace the lens, housing, mounting block and other hardware elements that comprise a photoelectric sensor. The photoelectric sensor assembly of this invention comprises only three components plus mounting hardware such as screws and nuts. Two of the components are molded plastic members; the third component is a circuit board assembly which is substantially the same for either a source or detector assembly. One molded member is a housing molded of transparent plastic having optical characteristics when molded, the housing comprising an internal chamber open to one side of the housing and having a focusing lens molded integrally with the housing at a side opposite the open side of the chamber. The housing also includes a mounting block portion molded integrally therewith, the mounting block portion having a substantially semicylindrical recess in one side thereof and a pair of holes disposed at right angles to the axis of the semicylindrical recess. A circuit board having terminals connected thereto has a photoelectric sensor device of either the source or detector type selectively mounted thereon. Significant cost efficiency is realized by utilizing one circuit board for both the source and the detector module. The circuit board may be readily inserted or removed from the chamber of the housing and retained firmly in the chamber by light finger pressure to facilitate initial assembly and subsequent removal and replacement of the circuit board in the event repair becomes necessary.

The other molded member is a cover for the open side of the housing, the cover overlying the circuit board and retaining the same in its assembled position. In a preferred embodiment, the cover also includes a clamping portion which is coextensive with the mounting block portion of the housing, the clamping portion having a semicylindrical recess complemental to that of the mounting block portion and a pair of holes transverse to the axis of the semicylindrical recess aligned with the holes in the mounting block. A pair of screws are provided for securing the clamping portion against the mounting block around a mounting bar or the like for mounting the sensor assembly to a structural member. The photoelectric sensor assembly of this invention thus comprises only three major distinct elements plus the mounting screws (and nuts, if required). A pair of the photoelectric sensor assemblies of this invention are utilized in combination, one comprising a light source and the other comprising a detector, to provide a through beam photoelectric sensor.

The invention, its features and advantages will be more readily understood when reading the following specification and claims in conjunction with the accompanying drawings.

BRIEF DESCRIPTION OF THE DRAWINGS

FIG. 3 is a rear elevational view of a housing of the photoelectric sensor assembly shown in FIG. 1;

FIG. 4 is a cross sectional view of the photoelectric sensor assembly shown in FIG. 1 taken along the vertical center line of the assembly;

FIG. 5 is a front elevational view of the cover shown in FIG. 2;

FIG. 6 is a cross sectional view of the housing shown in FIGS. 3 and 4 taken along the line 6—6 in FIG. 4, with a circuit board exploded therefrom;

FIG. 8 is a plan view of the circuit board and photoelectric device used as a photoelectric source;

FIG. 9 is a wiring schematic of the circuit board shown in FIG. 8;

FIG. 10 is a plan view of the circuit board and photoelectric device used as a photoelectric detector;

FIG. 11 is a wiring schematic of the circuit board shown in FIG. 10; and

DESCRIPTION OF THE PREFERRED EMBODIMENTS

Figure 1:
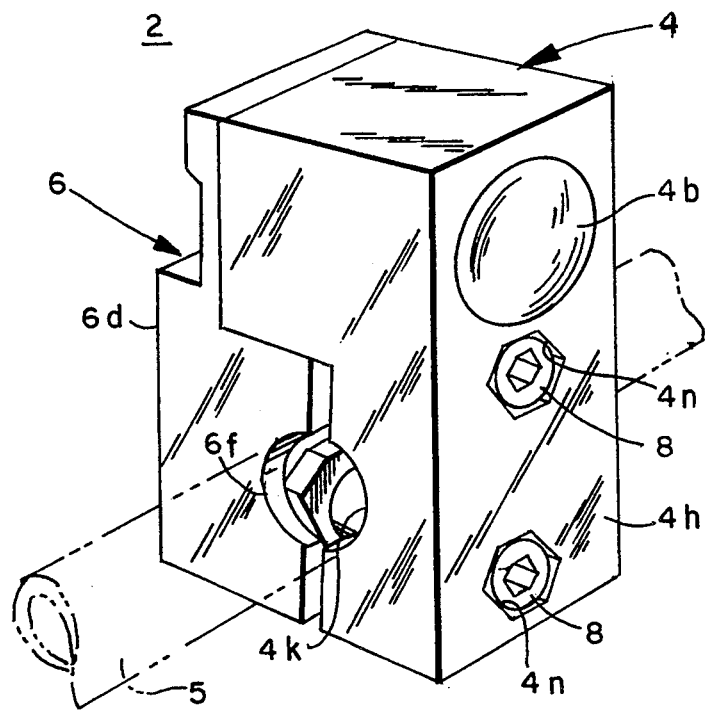
FIG. 1 is a perspective view of the photoelectric sensor assembly of this invention.

Referring to the drawings, the photoelectric sensor assembly 2 of this invention comprises a molded transparent plastic housing 4 having a cover 6 attached thereto by a pair of screws 8 which cooperatively receive threaded nuts 10 (FIG. 4). The material of housing 4 is a thermoplastic polyacrylic or polycarbonate that can be fabricated with optical characteristics. Preferably this material is a natural transparent polycarbonate sold by the General Electric Company under the trademark "Lexan". Housing 4 comprises a hollow chamber 4a (FIGS. 3, 4 and 6) open to the rear of the housing. The front wall of housing 4 adjacent chamber 4a has focusing a lens portion 4b integrally molded therewith. The interior and exterior surfaces of lens portion 4b are formed with an optical quality by particularly polishing these areas of the mold die. A pair of ribs 4c extend along opposite interior side wall surfaces of chamber 4a from the closed end adjacent lens portion 4b to the open rear side thereof. The ends of ribs 4c adjacent the open side of housing 4 have stepped-down semicylindrical bosses 4d formed thereon providing a shoulder between the respective rib 4c and bosses 4d. A third boss 4d is formed on the face of a bottom wall 4e of the housing adjacent chamber 4a. The rear ends of the side walls of housing 4 have inwardly turned stub walls 4f (FIGS. 3 and 6) defining a gap 4g therebetween which extends under bottom wall 4e. A mounting block portion 4h extends downwardly along the front of housing 4. As seen in FIG. 3, mounting block portion 4h is substantially hollow, being defined by the side walls of housing 4 and having a central rib 4j. Each of the side walls and the central rib 4j have a substantially semicircular recess 4k which together define a semicylindrical recess in a rear face of the mounting block portion 4h. Immediately above and below the recess 4k in central rib 4j are holes 4m extending through the mounting block portion 4h from front to rear at substantially right angles to the axis for the semicylindrical recess. A hexagonal counterbore 4n is molded in the front face of mounting block portion 4h around the holes 4m.

Figure 2:
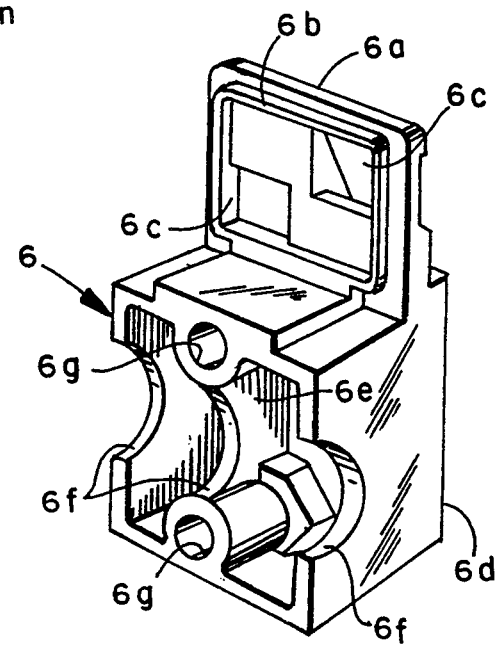
FIG. 2 is a perspective view of a cover of the photoelectric sensor assembly shown in FIG. 1.

Cover 6 is a molded plastic member, also molded of transparent plastic such as the transparent polycarbonate of housing 4, although it could be molded of an opaque or translucent plastic without affect on the performance of the sensor assembly of this invention. The cover 6 is separately shown in perspective in FIG. 2 and in front elevation in FIG. 5. An upright rectangular portion 6a of the cover overlies the open rear side of housing 4. Rectangular portion 6a has a rectangular rib 6b that projects into the chamber 4a around the periphery of the opening and stub walls 4f of housing 4 extend under the lower corners of the rib 4b to position the cover 6 in place on housing 4. A pair of diagonally disposed openings 6c are provided in rectangular portion 6a through which terminals of the circuit board project as will be described hereinafter.

Cover 6 also comprises a lower clamping portion 6d which is coextensive with mounting block portion 4h when housing 4 and cover 6 are assembled together. Clamping portion 6d is similar to mounting block portion 4h in that it is substantially a hollow structure defined by a pair of outer sides of the cover 6 and has a central rib 6e. The outer sides and the central rib 6e each have substantially semicircular recesses 6f which together define a semicylindrical recess open to the front side of clamping portion 6d. Above and below the recess 6f in central rib 6e are a pair of holes 6g extending through the clamping portion 6d from front to rear at right angles to the axis for the semicylindrical recess and aligned with the holes 4m of mounting block portion 4k when cover 6 is positioned to housing 4. Hexagonal counter bores 6h (FIG. 4) are molded in the rear face of clamping portion 6d around the holes 6g. Screws 8 extend through the holes 6g into the counterbores 6h where hexagonal nuts 10 are received to be threadably engaged by screws 8. When the cover 6 and housing 4 are secured together by the screws 8 and nuts 10, the recesses 4k and 6f cooperatively define a circular opening with the mating surfaces of the mounting block portion 4h and clamping portion 6d being spaced apart as shown in FIGS. 1 and 4. Thus the sensor assembly 2 may be assembled around or inserted over a mounting member such as a conduit, pipe or similar round bar 5 (shown in dot-dash lines in FIG. 1) having a diameter substantially equal to the circular opening defined by the recesses 4k and 6f and clamped firmly thereon by tightening the screws 8 into the nuts 10. It will be appreciated that the screws 8 and nuts 10 can be assembled to the sensor assembly 2 in the reverse direction to that shown if so desired.

Figure 7:
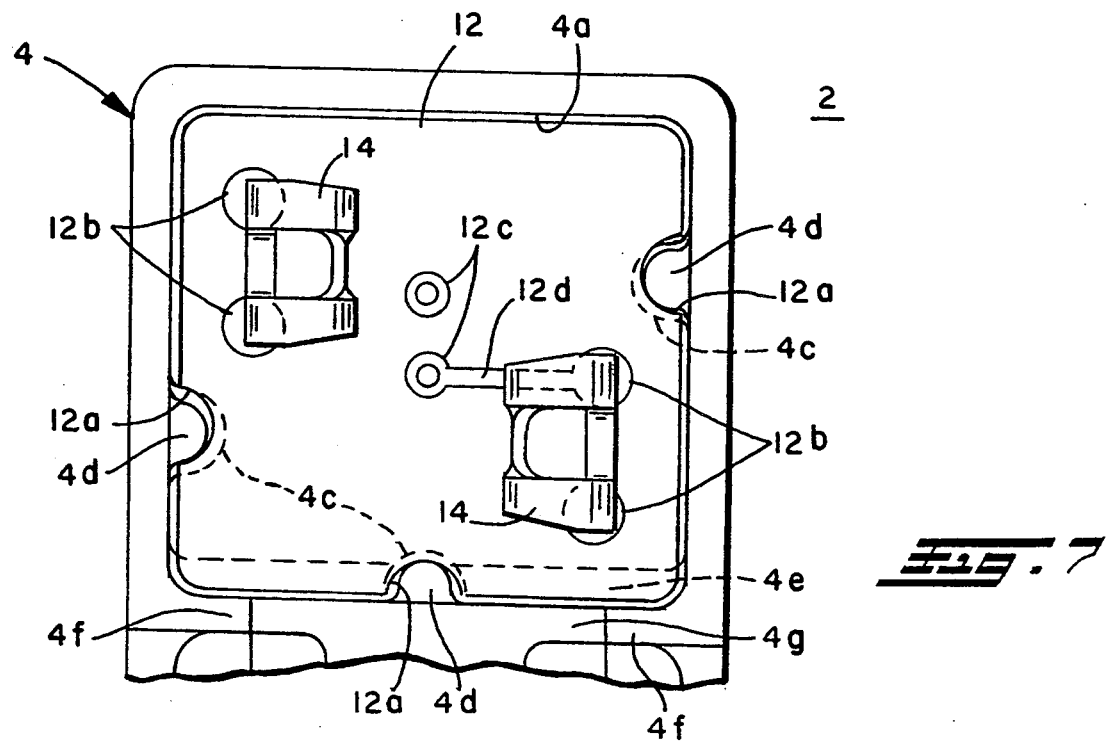
FIG. 7 is a partial view of the rear of the housing showing an open side of the housing with the circuit board mounted therein.

A circuit board 12 is mounted in the chamber 4a prior to attaching the cover 6 to the housing 4. Circuit board 12 has a rectangular profile complemental to the interior profile of chamber 4a and is dimensioned to provide a minimal clearance in the opening. As seen in FIGS. 7, 8 and 10, circuit board 12 is provided with three semicircular recesses 12a in the bottom and two opposite side edges of the circuit board as oriented in the drawings. The radius defining the respective recesses 12a is larger than the corresponding radius defining the semicylindrical bosses 4d. Further, as may be seen particularly in FIG. 7, the recesses 12a in the side edges of circuit board 12 are offset upwardly from the bosses 4d such that engagement between the respective bosses 4d and recesses 12a occurs in the lower quadrant of each, thereby urging circuit board 12 downwardly upon the crest of the boss 4d engaging the recess 12a in the bottom edge of the circuit board. This provides a three-point interference fit for the circuit board 12 within the housing chamber 4a. The circuit board 12 may be inserted and removed from chamber 4a with only light finger pressure, but will remain firmly in place against the shoulders between ribs 4c and bosses 4d and against the face of bottom wall 4e while installing and removing cover 6. The location of the respective ribs 4c, bosses 4d and recesses 12a at the left and right-hand sides of the housing chamber 4a and circuit breaker 12, respectively, provide for proper orientation of the circuit board 12 relative to the housing 4. As seen in FIG. 7, the rib 4c, boss 4d and respective recess 12a on the left-hand side of the chamber 4a are located closer to bottom wall 4e of the chamber than are the similar features on the right-hand side of the chamber. Further, no boss or recess are provided along the top edge of the chamber and circuit board. This arrangement of mounting bosses and recess permits the circuit board assembly to be assembled only in one (proper) orientation.

Circuit board 2 has a pair of wiring terminals 14 mounted thereon projecting from a surface exposed to the rear of the sensor assembly. Each wiring terminal 14 has a pair of round posts 14a which project through and are secured within plated through holes 12b formed in the upper left and lower right-hand quadrants of the circuit board 12 as viewed from the back in FIG. 7. A central pair of plated through holes 12c receive respective pins of a photoelectric sensor device 16 attached to the opposite surface of circuit board 12 as wiring terminals 14. As may be seen in FIG. 7, a conductive trace 12d connects one of the plated through holes 12c to one of the plated through holes 12b directly connecting one pin of the photoelectric device 16 to a terminal 14 of the circuit board 12. Circuit board 12 is particularly arranged to receive either a photoelectric sensor source such as a light emitting diode (LED) 16a (FIGS. 6, 8 and 9) or a photoelectric sensor detector such as a phototransistor 16b as seen in FIGS. 10 and 11. Each device 16a and 16b has two pin terminals which are received in the plated through holes 12c for mounting the device to the circuit board 12. The opposite surface of circuit board 12 is provided with a pattern of electrically conductive traces as seen in FIGS. 8 and 10. A pair of resistors R1 and R2 are mounted to the traces by surface mount technology for either source or detector application of the circuit board 12.

The source circuit board 12 is shown in FIG. 8 and the schematic diagram therefore is shown in FIG. 9. The photoelectric sensor source is the light emitting diode 16a connected in series with resistor R2 between positive and negative wiring terminals 14. A diode D1 is surface mounted to the traces in series with resistor R1 and reversely poled around LED 16a to protect the LED in the event the sensor is connected with reverse polarity. Diode D1 has three terminals for mounting purposes, but the diode is actively connected between only two of the terminals. As viewed in FIG. 8, the upper right-hand terminal of diode D1 is not electrically active. Three pads 12e, 12f and 12g of the conductive traces are not utilized in the circuit board 12 for the photoelectric sensor source.

The circuit board 12 for the photoelectric sensor detector is shown in FIG. 10 and the schematic diagram therefor is shown in FIG. 11. The photoelectric sensor detector is phototransistor 16b which has its collector-emitter connected in series with resistor R2 between the positive and negative wiring terminals 14. A transistor Q1 has its collector-emitter connected in series with resistor R1 between terminals 14(+) and 14(−) across phototransistor 16b and resistor R2. The base of transistor Q1 is connected to the junction between the emitter of phototransistor 16b and resistor R2. A second transistor Q2 has its emitter-collector path connected directly in series with terminals 14(+) arid 14(−) in shunt of the remainder of the detector circuit. The base of transistor Q2 is connected to the junction of resistor R1 and the collector of transistor Q1. Transistors Q1 and Q2 are attached to the conductive traces of circuit board 12 by surface mount technology, the transistor Q2 being attached to the pads 12e, 12f and 12g which were unused in the embodiment for the emitter. Transistors Q1 and Q2 provide amplification of the signal provided by phototransistor 16b.

The circuit board assembly is either a source or a detector according to the particular components attached thereto. The circuit board is inserted into chamber 4a of housing 4 through the open rear side thereof with the photoelectric sensor device 16a or 16b facing lens portion 4b of housing 4 and wiring terminals 14 extending to the rear of the sensor assembly. The circuit board is positioned within the housing by its engagement with the shoulders on ribs 4c and with face 4e such that the photoelectric device is properly located relative to the focal length of the lens. Cover 6 is then attached to the housing 4 and the sensor assembly 2 is secured together and to a mounting conduit, bar or post by screws 8 and nuts 10 as aforedescribed. The photoelectric sensor assembly herein described is used in through beam photoelectric sensor applications wherein a sensor assembly having a source element is used in cooperation with a second like sensor assembly having a detector element.

A low cost photoelectric sensor assembly is achieved by molding the housing of a plastic material having optical qualities, whereby a lens is an integrally molded portion of the housing, and by integrally molding mounting structure with the housing and the cover. Provision of a circuit board common to both a source circuit and a detector circuit reduces the cost of the circuit board assembly. Mounting features for the circuit board in the housing are incorporated in the housing molding. Finally, provision of only three major components for the sensor assembly, i.e. the housing, the cover and the circuit board assembly, reduces manufacturing stock and assembly time, each of which contribute to reduced cost. Field repairability is accomplished by making the circuit board assembly easily removable and replaceable.

Figure 12:
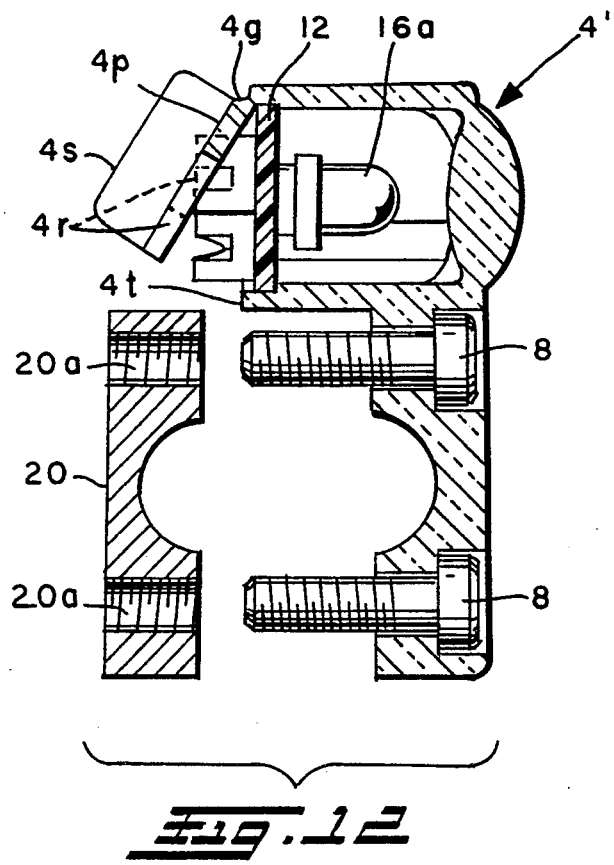
FIG. 12 is a center-line cross sectional view of an alternate embodiment of the photoelectric sensor assembly of this invention.

The foregoing has described a preferred embodiment and best mode contemplated of providing the photoelectric sensor assembly according to this invention. However, it is to be understood that the invention is susceptible of various modifications without departing from the scope of the appended claims. By example, one contemplated alternative embodiment is shown in FIG. 12. Housing 4 is essentially the same as aforedescribed and is given the number 4'. A particular difference is that housing 4' has a cover 4p integrally molded therewith, connected to the main body portion of the housing by a living hinge 4q. Cover 4p has a pair of holes 4r for the wiring terminals of the circuit board 12, and a rearwardly projecting barrier 4s disposed between the holes and therefore between the terminals. The lower wall of housing 4' defining the bottom of chamber 4a' is extended rearwardly at 4t to provide a ledge against which the bottom edge of cover 4p can engage either with a snap fit detent or a press fit to hold the cover closed over the circuit board 12. In the modified embodiment, a separate clamping member 20 is provided. Member 20 may be made of metal or of plastic. In the embodiment shown, a metal clamping member 20 has threaded holes 20a for receiving screws 8, thereby eliminating separate nuts 10. Moreover, a formed metal strap having threaded nuts welded thereto can be used in place of the member 20.

We claim:

1. A through beam photoelectric sensor assembly comprising:

a molded transparent plastic housing comprising a chamber open to one side of said housing, a focusing lens portion integrally molded in a wall of said housing defining said chamber, said wall being opposite said open side, and a mounting block portion extending away from said chamber;

a circuit board positioned in said chamber at said open side, said circuit board comprising wiring terminals projecting from one surface of said board and a photoelectric device on an opposite surface of said board, said photoelectric device being disposed within said chamber and facing said lens portion;

a molded plastic cover overlying said open side of said housing and said circuit board, said cover comprising openings for said wiring terminals and a clamp portion extending therefrom substantially coextensive with and spaced from said mounting block portion;

aligned holes in said mounting block portion and said clamp portion; and fastener means extending through respective said aligned holes for contemporaneously securing said cover to said housing and clamping said sensor assembly to a mounting member.

2. The through beam photoelectric sensor assembly defined in claim 1 wherein mutually adjacent sides of said mounting block portion and said clamp portion have aligned recesses which cooperatively define an opening for said mounting member.

3. The through beam photoelectric sensor assembly defined in claim 2 wherein said recesses are substantially semicylindrical and substantially define a circle with said clamp portion and said mounting block portion coextensively disposed.

4. The through beam photoelectric sensor assembly defined in claim 2 wherein at least one of said mounting block portion and said clamp portion have straight-sided counterbore pockets formed concentric with respective said aligned holes, and said fastener means comprises screws extending through said aligned holes and threaded nuts disposed in said straight-sided counterbore pockets threadably engaged by said screws.

5. The through beam photoelectric sensor assembly defined in claim 1 wherein said photoelectric device is selected from a group consisting of photoelectric sources and photoelectric detectors.

6. The through beam photoelectric sensor assembly defined in claim 5 wherein said circuit board comprises conductive traces connected to said wiring terminals and said photoelectric device, said circuit board, said traces and said wiring terminals being identical for either said selected photoelectric device mounted to said circuit board.

7. The through beam photoelectric sensor assembly defined in claim 6 wherein said housing comprises a plurality of bosses in said chamber adjacent said open side and said circuit board comprises a corresponding plurality of recesses in side edges thereof, said bosses and said recesses being arranged to insure predetermined orientation of said circuit board to said housing, and to provide an interference fit for said circuit board in said housing chamber.

8. The through beam photoelectric sensor assembly defined in claim 7 wherein said bosses and said recesses are substantially semicylindrical, a radius defining respective said recesses being larger than a corresponding radius defining respective said bosses for effecting single-point engagement of a respective boss within a respective recess.

9. The through beam photoelectric sensor assembly defined in claim 8 wherein said single-point engagement of said bosses and said recesses provide an interference fit for mounting said circuit board in said housing chamber.

* * * * *